United States Patent
Rheaume

(10) Patent No.: US 10,472,083 B2
(45) Date of Patent: Nov. 12, 2019

(54) SELECTIVE METHOD OF OPERATION OF ULLAGE PASSIVATION SYSTEM

(71) Applicant: HAMILTON SUNDSTRAND CORPORATION, Windsor Locks, CT (US)

(72) Inventor: Jonathan Rheaume, West Hartford, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 328 days.

(21) Appl. No.: 15/378,687

(22) Filed: Dec. 14, 2016

(65) Prior Publication Data

US 2018/0162544 A1    Jun. 14, 2018

(51) Int. Cl.
  *B64D 37/32*    (2006.01)
  *B64D 37/02*    (2006.01)

(52) U.S. Cl.
  CPC ............ *B64D 37/32* (2013.01); *B64D 37/02* (2013.01); *Y02T 50/44* (2013.01)

(58) Field of Classification Search
  None
  See application file for complete search history.

(56) References Cited

U.S. PATENT DOCUMENTS

| | | | |
|---|---|---|---|
| 6,904,930 B2 | 6/2005 | Susko | |
| 7,007,893 B2 | 3/2006 | Loss et al. | |
| 7,191,983 B2 | 3/2007 | Loss et al. | |
| 7,306,644 B2 | 12/2007 | Leigh et al. | |
| 7,352,464 B2 | 4/2008 | Chen et al. | |
| 7,625,434 B2 | 12/2009 | Tom et al. | |
| 7,806,966 B2 | 10/2010 | Bose | |
| 7,905,259 B2 | 3/2011 | Johnson et al. | |
| 7,921,869 B2 * | 4/2011 | Surawski | B64D 37/32 137/209 |
| 8,192,532 B1 * | 6/2012 | Gupta | B64D 37/32 244/129.2 |
| 8,801,831 B1 | 8/2014 | Snow, Jr. et al. | |
| 9,298,193 B2 | 3/2016 | Susko | |
| 2005/0224654 A1 * | 10/2005 | Loss | B64D 37/32 244/129.2 |
| 2014/0208943 A1 * | 7/2014 | Gupta | B64D 37/32 95/14 |
| 2015/0217153 A1 * | 8/2015 | Jones | B64D 37/32 169/62 |
| 2016/0144973 A1 * | 5/2016 | Darling | B64D 37/32 204/265 |
| 2018/0094557 A1 * | 4/2018 | Zopey | B64D 37/08 |

FOREIGN PATENT DOCUMENTS

EP    3263187 A2    1/2018

OTHER PUBLICATIONS

European Search Report for European Application No. 17207126.8 dated Feb. 13, 2018, 10 pages.

* cited by examiner

*Primary Examiner* — David P. Merlino
(74) *Attorney, Agent, or Firm* — Cantor Colburn LLP

(57) ABSTRACT

A method of selectively operating an ullage passivation system includes receiving at least one of a temperature signal and a vapor composition signal. The method further includes operating an ullage passivation system to provide a fluid to the fuel tank, in response to at least one of a temperature exceeding a temperature threshold and a component of the vapor composition exceeding a threshold composition.

17 Claims, 2 Drawing Sheets

SELECTIVE METHOD OF OPERATION OF ULLAGE PASSIVATION SYSTEM

BACKGROUND

An aircraft may be provided with an ullage passivation system that may be used to render fuel tank gases within the aircraft substantially inert. The ullage passivation system is employed to reduce the possibility of a thermal event within the fuel tank. Ullage passivation systems are continuously operated on commercial and military aircraft to maintain the ullage gas mixture below lean flammability limits during all phases of aircraft flight. The continuous operation of the ullage passivation system may increase fuel costs of the aircraft.

BRIEF DESCRIPTION

According to an embodiment of the present disclosure, an aircraft safety system is provided. The aircraft safety system includes an ullage passivation system and a controller. The ullage passivation system is arranged to selectively provide a fluid flow to a fuel tank. The controller is in communication with the ullage passivation system. The controller is programmed to selectively operate the ullage passivation system to provide the fluid flow to the ullage of the fuel tank based on at least one of a temperature and a vapor composition.

According to another embodiment of the present disclosure, a controller for an aircraft safety system is provided. The controller includes input communication channels, output communication channels, and control logic. The input communication channels are configured to receive at least one of a temperature and a vapor composition of a fuel tank. The output communication channels are configured to provide commands to an ullage passivation system. The control logic is configured to operate the ullage passivation system to provide a fluid to the fuel tank, in response to at least one of a temperature in the fuel tank exceeding a temperature threshold and a component of the vapor composition of the ullage of the fuel tank exceeding a threshold composition.

According to yet another embodiment of the present disclosure, a method of selectively operating an ullage passivation system is provided. The method includes receiving at least one of a temperature signal and a vapor composition signal. The method further includes operating an ullage passivation system to provide a fluid to the fuel tank, in response to at least one of the temperature of the ullage of the fuel tank exceeding a temperature threshold and a component of the vapor composition of the ullage exceeding a threshold composition.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
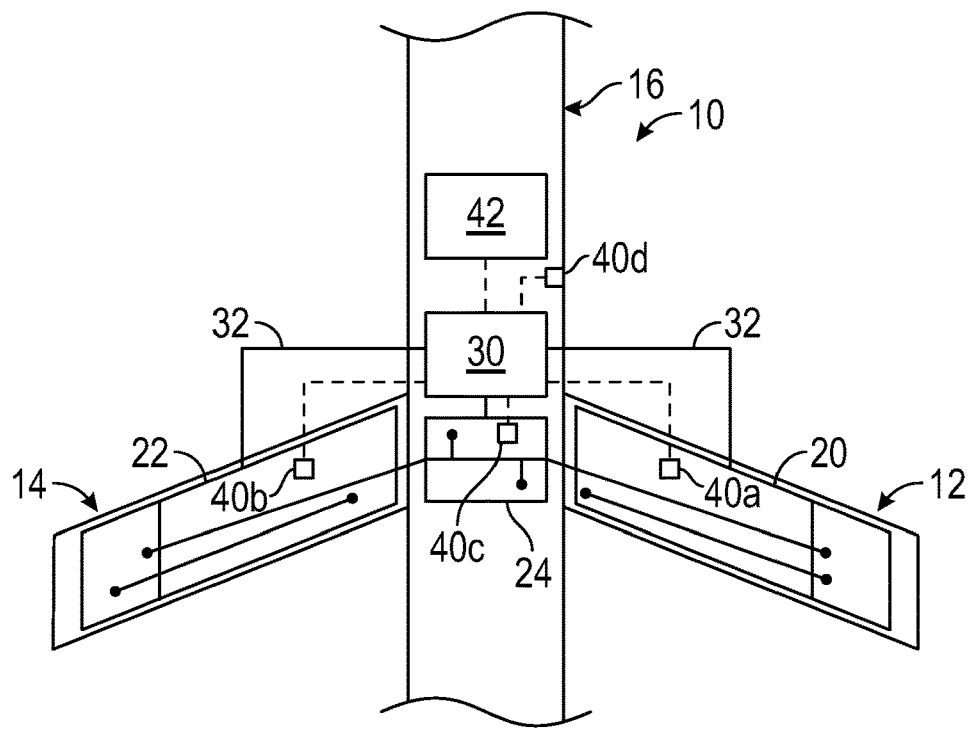
FIG. 1 is an illustrative view of an aircraft having a ullage passivation system.

Referring to FIG. 1, an aircraft 10 having a first wing 12 and a second wing 14 extending from a body such as a fuselage 16 is shown. A first fuel tank 20 is disposed within the first wing 12. A second fuel tank 22 is disposed within the second wing 14. A fuselage fuel tank 24 is disposed within the fuselage 16. The first fuel tank 20, the second fuel tank 22, and the fuselage fuel tank 24 may be in fluid communication with each other.

The first fuel tank 20, the second fuel tank 22, and/or the fuselage fuel tank 24 may receive fuel. The first fuel tank 20, the second fuel tank 22, and/or the fuselage fuel tank 24 may have a space that is disposed above the fuel in which fuel vapors may be present. This space is commonly referred to as ullage.

The aircraft 10 may be provided with an aircraft safety system, such as an ullage passivation system 30 that is disposed within the fuselage 16. The ullage passivation system 30 is fluidly connected to the first fuel tank 20, the second fuel tank 22, and the fuselage fuel tank 24 through fluid conduits 32. The ullage passivation system 30 is arranged to selectively provide a fluid flow of inert gas into an ullage of the first fuel tank 20, the second fuel tank 22, and/or the fuselage fuel tank 24 through the fluid conduit 32.

The ullage passivation system 30 may include an air separation module, an on-board inert gas generation system, an electrochemical device such as a fuel cell or an electrolyzing gas separator or an oxygen pump that produces oxygen depleted air, a catalytic oxidation system configured to oxidize fuel, and/or an ullage cooling system. The ullage cooling system may be arranged to provide cool, dry air from an environmental control system to an ullage of a fuel tank. The ullage passivation system 30 receives air from a source such as an engine, an air compressor that is separate from the engine, or another source. The ullage passivation system 30 may provide an inert gas, cooled air, or the like into the ullage of at least one of the first fuel tank 20, the second fuel tank 22, and the fuselage fuel tank 24 through the fluid conduit 32.

The ullage passivation system 30 includes sensors 40a, 40b, 40c, 40d and a controller 42.

Figure 2:
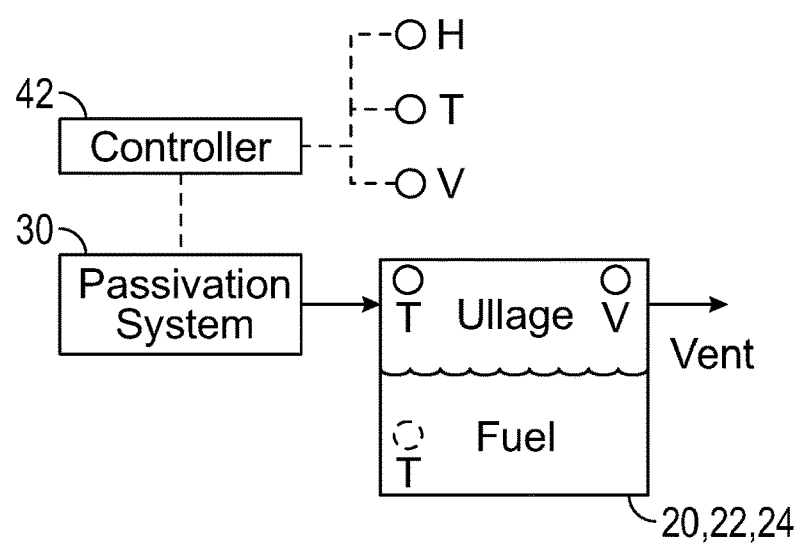
FIG. 2 is a schematic illustration of the ullage passivation system.

Referring to FIGS. 1 and 2, the first fuel tank 20, the second fuel tank 22, and/or the fuselage fuel tank 24. The sensor 40a is disposed within the ullage of the first fuel tank 20. The sensor 40b is disposed within the ullage of the second fuel tank 22. The sensor 40c is disposed within the ullage of the fuselage fuel tank 24. The sensor 40d is disposed on or within the fuselage 16. The sensors 40a, 40b, 40c, 40d are in communication with the controller 42 of the ullage passivation system 30.

Referring to FIG. 2, the sensors 40a, 40b, 40c are arranged to provide a signal indicative of a temperature and/or a vapor composition of the ullage of a fuel tank to which it is connected. Each of the sensors 40a, 40b, 40c may be configured as a temperature sensor, T, which provides a temperature signal to the controller 42. The temperature sensor, T, is positioned within the ullage to measure or monitor a temperature of the ullage of at least one of the first fuel tank 20, the second fuel tank 22, and/or the fuselage fuel tank 24. Each of the sensors 40a, 40b, 40c may be configured as a chemical sensor or a vapor composition sensor, V, which provides a vapor composition signal to the controller 42. The vapor composition sensor, V, is positioned within the ullage of at least one of the first fuel tank 20, the second fuel tank 22, and/or the fuselage fuel tank 24 to measure or monitor the vapor composition of gaseous vapors within the ullage of at least one of the first fuel tank 20, the second fuel tank 22, and/or the fuselage fuel tank 24. The vapor composition sensor, V, is configured to measure or determine a concentration of a component of the vapor composition of the ullage of at least one of the first fuel tank 20, the second fuel tank 22, and/or the fuselage fuel tank 24.

In at least one embodiment, the controller 42 may be in communication with a fuel temperature sensor that is disposed within each fuel tank. The fuel temperature sensor is arranged to provide a signal indicative of a temperature of the fuel of the fuel tank.

The sensor 40d may be arranged to provide a signal indicative of ambient air humidity. For example, the sensor 40d may be disposed on or within the first wing 12, the second wing 14, and/or the fuselage 16. The sensor 40d may be configured as a humidity sensor, H, that is positioned to measure the ambient air humidity and provides an ambient air humidity signal to the controller 42.

The controller 42 is in communication with the ullage passivation system 30 and the sensors 40a, 40b, 40c, 40d. In at least one embodiment, the controller 42 may be integrated into the ullage passivation system 30 and may be in communication with an overall aircraft control system or monitoring system. The controller 42 is configured to or programmed to selectively control the operation of the ullage passivation system 30 to control the provision of a fluid flow to the first fuel tank 20, the second fuel tank 22 and/or the fuselage fuel tank 24. The controller 42 may be programmed with a look up table or performance map, enabling the controller 42 to anticipate operating conditions that may require operation of the ullage passivation system 30 to avoid a thermal event or water condensation within a fuel tank. The look up table or performance map may contain information that may cross-reference or correlate the inputs received by the controller 42 from the sensors 40 a, b, c, d or other sensors throughout the aircraft 10 to operating points of the ullage passivation system 30. In at least one embodiment, the controller 42 is configured to selectively control fluid control valves to selectively control the provision of fluid flow to the first fuel tank 20, the second fuel tank 22, and/or the fuselage fuel tank 24.

The controller 42 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 42 in controlling the ullage passivation system 30.

The controller 42 is provided with an ullage passivation system selective control strategy in an effort to reduce fuel consumption of aircraft 10. The ullage passivation system selective control strategy may be embodied as control logic of the controller 42 that may result in the controller 42 outputting operation or cease operation commands to the ullage passivation system 30. The ullage passivation system selective control strategy inhibits or prevents full-time operation of the ullage passivation system 30.

The controller 42 receives signals or information from the sensors 40a, 40b, 40c, 40d to determine whether to operate and/or cease operation of the ullage passivation system 30. The controller 42 may include input communication channels configured to receive a temperature of the ullage of a fuel tank, a vapor composition of the ullage of a fuel tank, a fuel temperature of a fuel disposed within a fuel tank, and/or an ambient air humidity from the sensors 40a, 40b, 40c, 40d. In at least one embodiment, the controller 42 may be in communication with other sensors, controllers, or monitoring systems. The controller 42 may include output communication channels configured to provide signals or commands to the ullage passivation system 30 to operate or cease operation.

The controller 42 may be configured to command the ullage passivation system 30 in response to or based on the detection or recognition of conditions under which fluid flow should be provided to inert vapors within a fuel tank. These conditions may be for example, at the top of descent or during descent.

The controller 42 may be configured to command the ullage passivation system 30 to operate and provide a fluid flow to the ullage of a fuel tank or directly into the fuel of the fuel tank in response or based on to the fuel temperature exceeding a predetermined fuel temperature threshold. The controller 42 may be configured to command the ullage passivation system 30 to cease operation and cease providing a fluid flow to the ullage of a fuel tank or directly into the fuel of the fuel tank in response to or based on the fuel temperature being or becoming less than the predetermined fuel temperature threshold.

The controller 42 may be configured to command the ullage passivation system 30 to operate and provide a fluid flow to the ullage of a fuel tank or directly into the fuel of the fuel tank in response to or based on an ullage temperature exceeding a predetermined ullage temperature threshold. The controller 42 may be configured to command the ullage passivation system 30 to cease operation and cease providing a fluid flow the ullage of a fuel tank or directly into the fuel of the fuel tank in response to or based on the ullage temperature being or becoming less than the predetermined ullage temperature threshold.

The controller 42 may be configured to command the ullage passivation system 30 to operate and provide a fluid flow to the ullage of a fuel tank or directly into the fuel of the fuel tank in response to or based on a component of a vapor composition of the ullage of a fuel tank exceeding a threshold composition concentration. The controller 42 may be configured to command the ullage passivation system 30 to cease operation and cease providing a fluid flow to the ullage of a fuel tank or directly into the fuel of the fuel tank in response to or based on the component of the vapor composition of the ullage of a fuel tank being or becoming less than the threshold composition concentration.

The controller 42 may be configured to command the ullage passivation system 30 to operate and provide a fluid flow to the ullage of a fuel tank or directly into the fuel of the fuel tank in response to or based on the ambient air humidity exceeding a humidity threshold. The ambient air humidity exceeding the humidity threshold may cause water or water vapor to enter into at least one of the fuel tanks, which on commercial aircraft are typically vented atmosphere. The water vapor may enter a fuel tank during descent on a warm, humid day, when higher pressure ambient air flows into a fuel tank through a vent. The water vapor may condense inside a fuel tank. The fluid flow to the ullage of a fuel tank may force or entrain the water vapor to flow out of a fuel tank. For example, the water vapor content in the ullage passivation system fluid flow entering a fuel tank may be 2 g of water vapor for each kg of the fluid flow; this may be extended to a humidity content of ullage gases. The controller 42 may be configured to command the ullage passivation system 30 to cease operation and cease providing a fluid flow to the ullage a fuel tank or directly into the fuel of the fuel tank in response to or based on the ambient air humidity being or becoming less than the humidity threshold.

Figure 3:
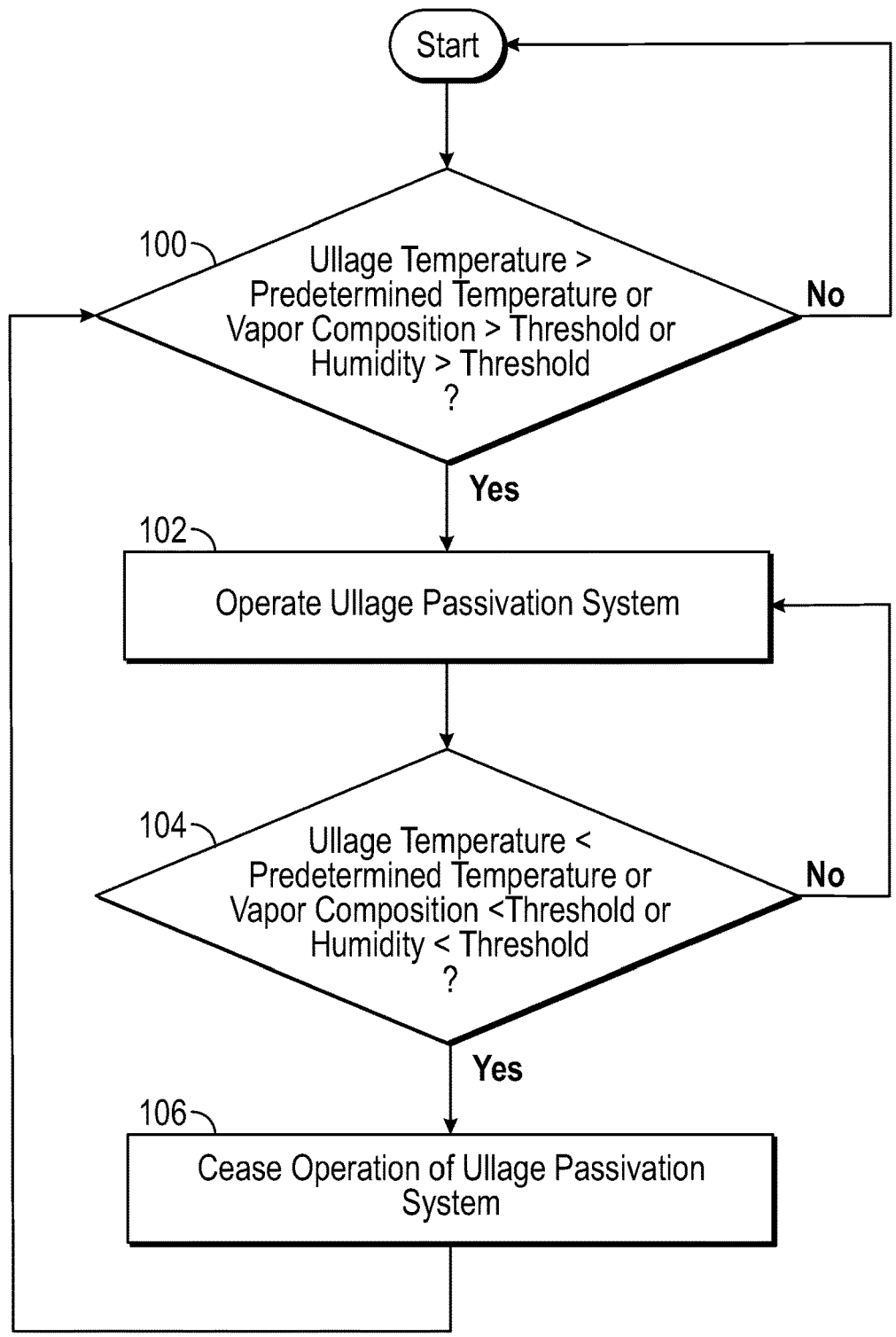
FIG. 3 is a flow chart of an algorithm for operating an ullage passivation system.

Referring to FIG. 3, a flow chart of an algorithm for operating an ullage passivation system is shown. The method may be executed by the controller 42 and may be implemented as a closed loop control system. For brevity, the method will be described in the context of a single method iteration.

The method monitors and receives a temperature of a fuel or of an ullage of a fuel tank, a vapor composition of an ullage of a fuel tank, and/or an ambient air humidity from the sensor 40. At block 100, the method compares the temperature of the fuel or the ullage of a fuel tank, the vapor composition of the ullage of a fuel tank, and/or the ambient air humidity to predetermined thresholds. Should the temperature of the fuel or the ullage of a fuel tank, the vapor composition of the ullage fuel tank, and/or the ambient air humidity not exceed the predetermined thresholds, the method returns to start and continues to monitor the temperature, vapor composition, and/or ambient air humidity. If the temperature of the fuel or the ullage of a fuel tank, the vapor composition of the ullage of a fuel tank, and/or the ambient air humidity is equal to or exceeds the predetermined thresholds, the method continues to block 102.

At block 102, the method commands the ullage passivation system 30 to operate to provide a fluid flow to the ullage of a fuel tank.

At block 104, the method compares the temperature of the fuel or the ullage of a fuel tank, the vapor composition of the ullage of a fuel tank, and/or the ambient air humidity to predetermined thresholds. Should the temperature of the fuel or the ullage of a fuel tank, the vapor composition of the ullage fuel tank, and/or the ambient air humidity continue to exceed the predetermined thresholds, the method returns to block 102 and the ullage passivation system 30 continues to operate to provide a fluid flow to the ullage of a fuel tank. If the temperature of the fuel or the ullage of each fuel tank, the vapor composition of the ullage of each fuel tank, and/or the ambient air humidity is less than the predetermined thresholds, the method continues to block 106.

At block 106, the method commands the ullage passivation system 30 to cease operation and to cease providing a fluid flow to the ullage of each fuel tank. The method continues to measure or monitor the temperature of the fuel or the ullage of each fuel tank, the vapor composition of the ullage of each fuel tank, and/or the ambient air humidity.

The selective part-time operation of the ullage passivation system 30 consumes less fuel for passivating and drying of the ullage of a fuel tank. The selective part-time operation of the ullage passivation system 30 may extend the service requirements or service life of the ullage passivation system 30 due to decreased operating time of the ullage passivation system 30. The selective part-time operation of the ullage passivation system 30 that uses catalytic oxidation ullage passivation reduces the energy loads to remove humidity and to cool the combustion gases produced by the catalytic oxidation ullage passivation reactions. The selective part-time operation of the ullage passivation system 30 reduces overall pollution output and reduces fuel loss of the aircraft. The selective part-time operation of the ullage passivation system 30 may possibly reduce the weight of the ullage passivation system by incorporating a smaller, higher capacity, higher pressure ullage passivation system. The selective part-time operation of the ullage passivation system 30 may keep the fuel tanks dry by using ambient relative humidity as a trigger and thus keep water vapor out of the fuel tanks. Removing water vapor and water from the fuel tanks avoids microbial contamination in the fuel, avoids degradation of the fuel heating value, obviates the possibility of ice formation, and decrease the chances of corrosion of surfaces and components in the fuel tanks.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft safety system, comprising:
a ullage passivation system arranged to selectively provide a gas flow to ullage in a fuel tank;
the ullage passivation system including:
a sensor disposed in a fuel tank and sensing a temperature of ullage in the fuel tank and/or a vapor composition of ullage in the fuel tank;
another sensor disposed within a wing or a fuselage and sensing an ambient air humidity, and
a controller in communication with the ullage passivation system, the controller being programmed to selectively operate the ullage passivation system to provide the gas flow to ullage in the fuel tank based on:
the ambient air humidity in the wing or fuselage exceeding a humidity threshold; and
at least one of the temperature of ullage in the fuel tank and the vapor composition of ullage in the fuel tank respectively exceeding a temperature threshold and a threshold composition.

2. The aircraft safety system of claim 1, wherein the controller is programmed with a performance map that correlates at least one of the temperature of ullage in the fuel tank and the vapor composition of ullage in the fuel tank to operating points of the ullage passivation system.

3. The aircraft safety system of claim 1, wherein the controller is further programmed to control operation of the ullage passivation system to provide the gas flow to ullage in the fuel tank when the temperature of ullage in the fuel tank exceed the temperature threshold.

4. The aircraft safety system of claim 3, wherein the controller is further programmed to control operation of the ullage passivation system to cease providing the gas flow to ullage in the fuel tank when the temperature of ullage in the fuel tank is less than the temperature threshold.

5. The aircraft safety system of claim 1, wherein the controller is further programmed to control operation of the ullage passivation system to provide the gas flow to ullage in the fuel tank when the vapor composition of ullage of the fuel tank exceeds the threshold composition.

6. The aircraft safety system of claim 5, wherein the controller is further programmed to control operation of the ullage passivation system to cease providing the gas flow to ullage in the fuel tank when the vapor composition of ullage of the fuel tank is less than the threshold composition.

7. The aircraft safety system of claim 1, wherein the ullage passivation system is an inert gas generation system and the gas flow to the ullage in the fuel tank is an inert gas flow.

8. The aircraft safety system of claim 1, wherein the ullage passivation system is a ullage cooling system.

9. A controller for an aircraft safety system, comprising:
input communication channels configured to receive ambient air humidity information representing an ambient air humidity in a wing and/or fuselage and at least one of temperature information representative of a temperature of ullage in a fuel tank and vapor composition information representative of a vapor composition of ullage in the fuel tank;
output communication channels configured to provide commands to a ullage passivation system; and
control logic configured to, in response to the ambient air humidity in the wing and/or fuselage exceeding a humidity threshold and at least one of the temperature of ullage in the fuel tank exceeding a temperature threshold and the vapor composition of ullage in the fuel tank exceeding a threshold composition, operate the ullage passivation system to provide a gas flow to ullage the in the fuel tank.

10. The controller of claim 9, wherein the input communication channels are further configured to receive the temperature of ullage in the fuel tank and wherein the control logic is further configured to operate the ullage passivation system, in response to the temperature of ullage in the fuel tank exceeding the temperature threshold.

11. The controller of claim 10, wherein the control logic is further configured to control operation of the ullage passivation system to cease providing the gas flow to ullage in the fuel tank in response to the temperature of ullage in the fuel tank being less than the temperature threshold.

12. The controller of claim 9, wherein the control logic is further configured to control operation of the ullage passivation system to cease providing the fluid to the fuel tank in response to the vapor composition of ullage in the fuel tank being less than the threshold composition.

13. The controller of claim 9, wherein the control logic is further configured to control operation of the ullage passivation system to cease providing the fluid to the fuel tank in response to the temperature of ullage in the fuel tank being less than the temperature threshold.

14. A method of selectively operating a ullage passivation system, comprising:
receiving:
an ambient air humidity signal representing an ambient air humidity in a wing and/or fuselage of an aircraft; and
at least one of a temperature signal representing a temperature of ullage in a fuel tank and a vapor composition signal representing a vapor composition of ullage in the fuel tank; and
operating the ullage passivation system to provide a gas flow to ullage in the fuel tank, in response to the ambient air humidity in the wing and/or fuselage exceeding a humidity threshold and at least one of the temperature of ullage in the fuel tank exceeding a temperature threshold and the vapor composition of ullage in the fuel tank exceeding a threshold composition.

15. The method of claim 14, further comprising:
ceasing providing the gas flow to the fuel tank, in response to the temperature of ullage in the fuel tank being less than the temperature threshold.

16. The method of claim 14, further comprising:
ceasing providing the gas flow to the fuel tank, in response to the vapor composition of ullage in the fuel tank being less than the threshold composition.

17. The method of claim 14, further comprising:
ceasing providing the gas flow to the fuel tank, in response to the ambient air humidity in the wing and/or fuselage being less than the humidity threshold.

* * * * *